March 18, 1958 C. H. BACKUS 2,827,304
GUIDE MEANS FOR BOAT TRAILERS
Filed Jan. 3, 1956
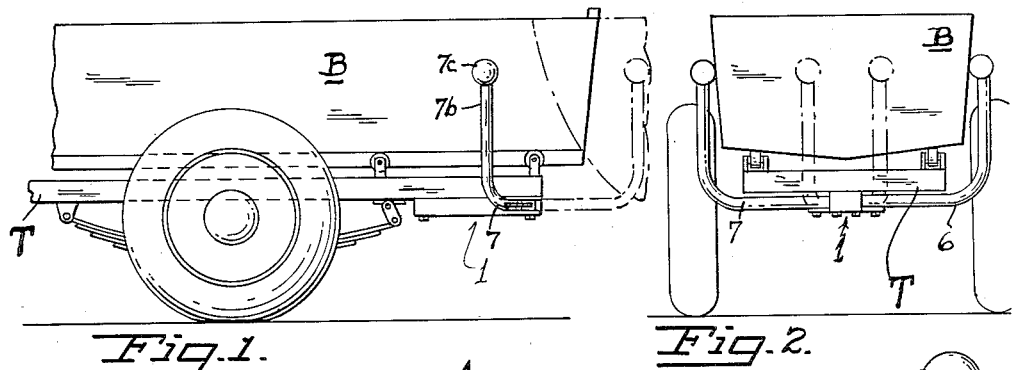
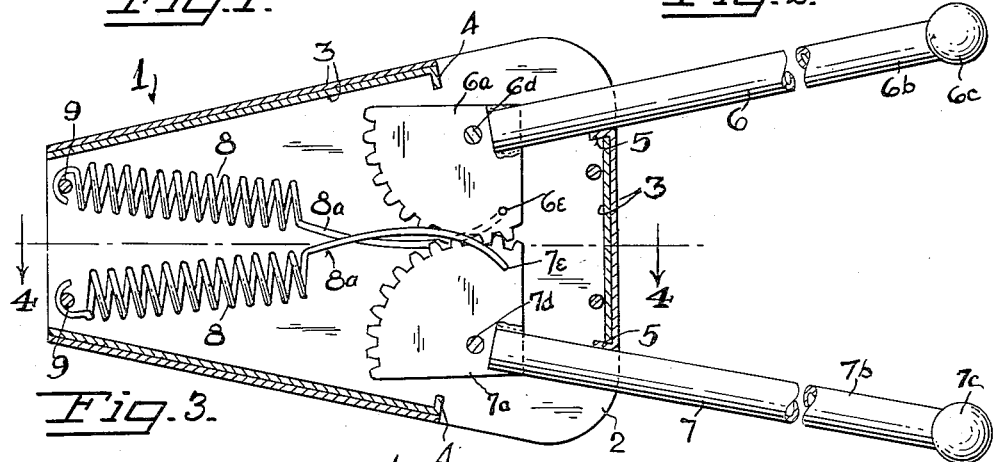
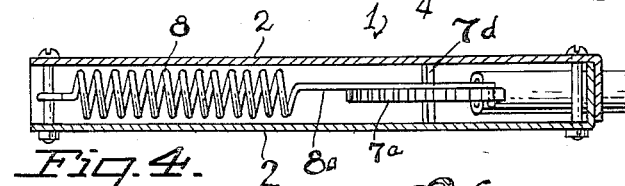
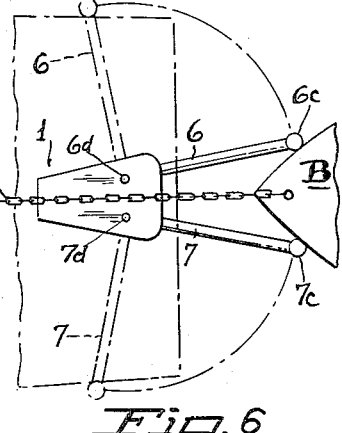
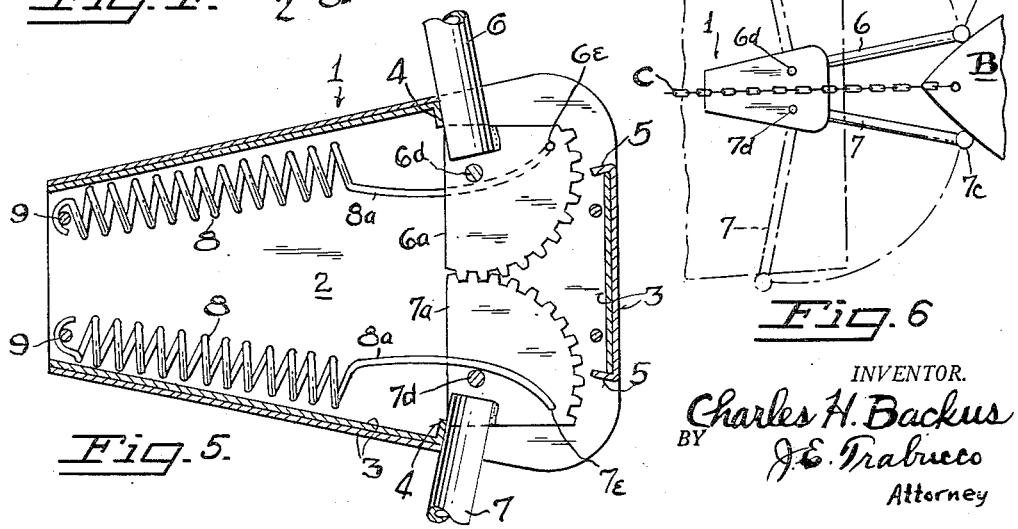
INVENTOR.
Charles H. Backus
BY J. E. Trabucco
Attorney

2,827,304

GUIDE MEANS FOR BOAT TRAILERS

Charles H. Backus, Belmont, Calif.

Application January 3, 1956, Serial No. 556,903

4 Claims. (Cl. 280—143)

This invention relates to guide means for use in loading a boat onto a trailer.

Boat trailers are now commonly used in transporting small boats from place to place. When transferring a boat from the water onto a trailer, it is desirable to maintain the boat in longitudinal alignment with the trailer as such boat is drawn forwardly onto the trailer; otherwise with the boat's rear end portion resting on the water and being free to swing from side to side, it is difficult to properly center the boat on the trailer.

The present invention provides novel guide means mounted on the rear end of a trailer for maintaining a boat in a longitudinally aligned position as it is being drawn forwardly by a winch from the water or other supporting medium onto such trailer. The guide means considerbaly simplifies and facilitates loading and unloading operations.

In its preferred form my improved guide means embodies two spring tensioned arms connected in such a way that they swing outwardly in unison in opposite directions as the sides of a boat being drawn forwardly between them exert outward pressures thereon. The spring tensioned arms are adapted to maintain uniform inward pressures in opposite directions upon the sides of the boat as the latter is drawn forwardly onto the trailer, thereby normally maintaining the longitudinal alignment of the boat with respect to the direction of the pull which is usually effected by means of a centrally positioned winch mounted forwardly on the trailer and connected by a cable to the bow of the boat. The spring means urging the arms inwardly are so arranged with respect to the pivot pins about which the arms pivot that as the arms swing outwardly beyond certain positions the spring means exert outward pressures thereon, thereby holding them in extreme outward positions where they normally prevent the rear end of the boat from shifting sidewise on the trailer.

The primary object of the present invention is to provide guide means for boat trailers which is designed to facilitate the loading and unloading of a boat onto and from a trailer.

Another object of my invention is to provide improved guide means for use in loading a boat onto a trailer, which also functions to prevent the sidewise displacement of the boat while the trailer is being towed from place to place.

Other and further objects of my invention will be pointed out hereinafter, or will be indicated in the appended claims or will be obvious to one skilled in the art upon an understanding of the present disclosure. For the purpose of the application, I have elected to show herein certain forms and details of guide means for boat trailers representative of my invention; it is to be understood, however, that the embodiment of my invention herein shown and described is for illustration purposes only and that it is not to be regarded as exhaustive of the variations of the invention in the art.

In the accompanying drawing:

Fig. 1 is a side view showing my improved guide means mounted on a trailer on which a boat has been loaded;

Fig. 2 is a rear view of the same;

Fig. 3 is a longitudinal sectional view taken through the supporting frame, showing the spring tensioned means connecting the guide arms;

Fig. 4 is a sectional view taken on the line 4—4 of Fig. 3;

Fig. 5 is a longitudinal sectional view taken through the supporting frame, showing the guide arms in widely swung positions; and Fig. 6 is a diagrammatic view showing by the full lines the position of the guide arms when first engaged by a boat being drawn onto a trailer, and showing also by the broken lines the position of the guide arms when the boat has been finally loaded on the trailer.

Referring to the drawing, the numeral 1 designates a suitably shaped frame or supporting structure, which in the form shown comprises opposed top and bottom plates 2, 2 having telescopically arranged flanges 3, 3 at their sides and rear ends. The rear ends of the side flanges and the outer ends of the rear flanges, respectively, provide abutments 4, 4 and 5, 5 which limit the forward and inward swinging movement, respectively, of two guide arms 6 and 7, as will be presently described.

Pivotally mounted between the rear portions of the plates 2, 2 are two segmental gears 6a and 7a, the teeth of which are in meshing relationship. Secured to the segmental gears 6a and 7a, respectively, are the rearwardly extending guide arms 6 and 7 which are formed with upturned rear end portions 6b and 7b, the latter preferably having rotatable members 6c and 7c on their ends. The teeth of each segmental gear 6a and 7a preferably extend along an arc of approximately ninety (90) degrees, and the pivots 6d and 7d about which the gears respectively rotate are preferably in the form of pins which extend between and are secured to the top and bottom plates 2, 2. The segmental gears 6a and 7a are rigidly secured to the forward ends of the guide arms 6 and 7, respectively, and such gears provide one of several possible connecting means for effecting the corresponding and simultaneous movement of the arms.

The segmental gears 6a and 7a are urged in clockwise and counterclockwise directions (Fig. 2), respectively, by tension springs 8, 8 which are connected through oppositely curved rigid extensions 8a, 8a to the rear ends of the gears at points adjacent the teeth thereof, as at 6e and 7e, respectively. The forward ends of the springs 8, 8 are connected to pins 9, 9 which are secured to the frame 1 near the forward end thereof. The springs normally maintain the gears in positions whereby the arms 6 and 7 are in abutting positions with respect to the abutments 5, 5. When outward pressures are exerted upon the arms, or either of them, sufficient to overcome the tension of the springs, said arms swing outwardly in opposite directions. With the continued outward pressure on the arms and the consequent movement thereof in outward directions against the inward pull of the springs, the points 6e and 7e where the spring extensions 8a, 8a connect with the segmental gears, move rearwardly and outwardly in arcuate paths about the pivots 6d and 7d as centers. When the arms 6 and 7 have swung outwardly in opposite directions sufficiently to bring the points 6e and 7e outwardly beyond the planes passing through the pivot 6d and its associated pin 9 and pivot 7d and its associated pin 9, respectively, said springs exert a pull on the gears which cause the arms to swing outwardly to positions engaging the abutments 4, 4. When so positioned, the springs normally exert sufficient tension on the gears 6a and 7a in counterclockwise and clockwise directions, respectively, to hold the arms 6 and 7 in extreme outwardly swung positions engaging with the abutments 4, 4. It will be noted that by providing suitable bends in the spring extensions 8a, 8a, the ends of the latter where they connect with the gears 6a and 7a, as at 6e and 7e, are adapted to move arcuately to positions outwardly with respect to the aforesaid planes passing through pivots 6d and 7d and their associated pins 9.

The frame 1 is usually attached by suitable means such as bolts and nuts or by welding, to the rear end of a trailer T. The frame 1 is preferably positioned centrally and in longitudinal alignment with respect to the trailer, and the slightly diverging guide arms 6 and 7 are disposed in corresponding positions at opposite sides of a common plane passing longitudinally through the trailer and the frame 1. The upwardly extending rear portions 6b and 7b of the guide arms are disposed in positions whereby the rotatable members 6c and 7c thereon are adapted to engage with the sides of the bow of a boat b as it is pulled onto the rear end of the trailer T by means of a chain or cable C and a winch (not shown) which is usually mounted in a central position on the front end of the trailer. As the boat is pulled forwardly, the diverging sides of the boat swing the guide arms 6 and 7 outwardly against the tension of the springs 8, 8 in the opposite directions. Since the pull on the boat is in a forward direction and the pressure of the guide arms is directed against the converging sides of the boat, the longitudinal center line of the boat will soon become aligned with the direction of the pull, which is usually in line with or in parallel relationship with the longitudinal center line of the trailer. Thus, as the boat is pulled forwardly from the water onto the trailer, it automatically becomes centered on the trailer, thereby making it unnecessary to shift the boat manually to a proper carrying position on the trailer. The guide arms 6 and 7 when swung outwardly to their extreme outward positions are arranged with their upwardly disposed rear end portions 6b and 7b positioned at opposite sides of the rear portion of the boat's hull, thereby preventing lateral shifting of the boat while being towed on the trailer.

It is to be understood that my improved guide means may be used to load a boat onto any other supporting device, whether it be mobile or stationary, so for this and other obvious reasons the term "trailer" as used herein shall be construed to include any kind of boat support.

What I claim is:

1. In guide means for loading a boat onto a trailer, or the like, a supporting frame adapted to be mounted on a trailer, a pair of rearwardly disposed guide arms having upstanding rear end portions, said guide arms being mounted in spaced relation on the frame and arranged for simultaneous outwardly and inwardly swinging movement, spring tensioned means connecting the guide arms and arranged to normally urge the arms toward one another, the said spring tensioned means being constructed and arranged to urge the arms in a direction opposite to their outward swinging movement when said arms have been swung outwardly beyond certain diverging positions.

2. In guide means for loading a boat onto a trailer, or the like, a supporting frame adapted to be mounted on a trailer, a pair of rearwardly and upwardly extending boat engageable guide arms extending forwardly from the frame and arranged for simultaneous outwardly and inwardly swinging movement in opposite directions, a pair of meshing segmental gears pivotally mounted on the frame, each gear being secured to and supporting one of the guide arms, and spring means connected to the gears and arranged to urge the gears in opposite rotary directions.

3. In guide means for loading a boat onto a trailer, or the like, a supporting frame adapted to be mounted on a trailer, a pair of segmental gears pivotally mounted on the frame in meshing relationship and arranged for pivotal movement in opposite directions, a pair of rearwardly and upwardly extending guide arms secured to the gears and arranged to swing outwardly and inwardly away from and toward each other, spring means connected to and arranged to urge the gears in opposite rotary directions, and stop means on the frame for limiting the inward and outward movement of the guide arms.

4. In guide means for loading a boat onto a trailer or the like, a supporting frame adapted to be mounted on a trailer, a pair of meshing segmental gears pivotally mounted on the frame and arranged for pivotal movement in opposite directions, a pair of rearwardly and upwardly extending boat engageable guide arms secured to and supported by the gears and arranged for simultaneous swinging movement in opposite directions toward and away from each other, and spring means urging the arms toward each other.

References Cited in the file of this patent
UNITED STATES PATENTS

| | | |
|---|---|---|
| 635,300 | Condict | Oct. 24, 1899 |
| 2,332,991 | Commire | Oct. 26, 1943 |
| 2,781,119 | Talbot | Feb. 12, 1957 |